United States Patent [19]

Desbat et al.

[11] Patent Number: 5,229,040
[45] Date of Patent: Jul. 20, 1993

[54] CONDUCTIVE COLLOIDAL MATERIAL AND METHOD OF USING SAME

[75] Inventors: Bernard Desbat, Pessat; Jean-Claude Lassegues, Pessac, both of France

[73] Assignee: Saint-Gobain Vitrage International, Courbevoie, France

[21] Appl. No.: 477,790

[22] Filed: Feb. 9, 1990

[30] Foreign Application Priority Data

Feb. 9, 1989 [FR] France .................. 89 01666

[51] Int. Cl.$^5$ .................. G02F 1/00; G02F 1/01; B01J 13/00; H01B 1/06
[52] U.S. Cl. .................. 252/583; 252/308; 252/500; 252/518; 252/586; 359/270; 359/272
[58] Field of Search .......... 252/583, 586, 500, 518, 252/308; 350/357; 359/265, 270, 272

[56] References Cited

U.S. PATENT DOCUMENTS

| | | | |
|---|---|---|---|
| 4,116,545 | 9/1978 | Reddy | 350/357 |
| 4,174,152 | 11/1979 | Giglia et al. | 350/357 |
| 4,215,917 | 8/1980 | Giglia et al. | 350/357 |
| 4,282,118 | 8/1981 | Hwang | 252/518 |
| 4,303,748 | 12/1981 | Armand et al. | 429/192 |
| 4,573,768 | 3/1986 | Polak et al. | 350/357 |
| 4,578,326 | 3/1986 | Armand et al. | 429/192 |
| 4,893,908 | 1/1990 | Wolf et al. | 350/357 |
| 4,914,161 | 4/1990 | Muller et al. | 525/403 |
| 4,929,389 | 5/1990 | Aldissi | 252/500 |
| 4,959,162 | 6/1990 | Nakayama et al. | 252/500 |
| 4,959,180 | 9/1990 | Armes et al. | 252/518 |
| 4,990,581 | 2/1991 | Poulin | 252/500 |

FOREIGN PATENT DOCUMENTS

| | | |
|---|---|---|
| 0013199 | 7/1980 | European Pat. Off. . |
| 0119912 | 9/1984 | European Pat. Off. . |
| 0213985 | 3/1987 | European Pat. Off. . |
| 3736342 | 3/1988 | Fed. Rep. of Germany . |
| 2369585 | 5/1978 | France . |
| 2597491 | 10/1987 | France . |
| 53-048986 | 5/1978 | Japan . |

OTHER PUBLICATIONS

Tsuchida, et al., Lithium Ionic Conduction in Poly(Methacrylic Acid)-Polyethylene Oxide Complex Containing Lithium Perchlorate, *Solid State Ionics* 11, pp. 227-233 (1983).

Klooster, et al., Solvent Effects in Polyelectrolyte Solutions, *Macromolecules*, 17, pp. 2070-2093 (1984).

Hardy et al., Preparation and Electrical Response of Solid Polymer Electrolytes With Only One Mobil Species, *Journal of the American Chemical Society*, 107, 3823 (1985).

Primary Examiner—Robert L. Stoll
Assistant Examiner—Philip Tucker
Attorney, Agent, or Firm—Pennie & Edmonds

[57] ABSTRACT

Materials possessing ionic conductivity which are suitable for use as electrolytes, notably in electrochromic systems, comprising an ionomer obtained by the neutralization of a Bronsted polyacid by an MOH alkali metal hydroxide, the neutralization rate $\alpha$ being such that $0 < \alpha < \alpha_m$, where $\alpha_m$ is the neutralization rate beyond which a phase separation takes place. The ionomer comprises a polymeric chain having a plurality of anionic groups affixed thereto and a plurality of alkaline cations associated therewith. The material further comprises a polar solvent, capable of solubilizing or plasticizing the ionomer and of assuring a partial ionic dissociation as well as transporting the $M^+$ ions. Optionally, this material may comprise, in addition to the above, a Bronsted polybase soluble in the polar solvent which does not form a solid precipitate with the ionomer and an MX inorganic salt wherein $M^+$ is the same alkaline cation as that utilized to neutralize the polyacid and X is a monovalent anion.

16 Claims, No Drawings

CONDUCTIVE COLLOIDAL MATERIAL AND METHOD OF USING SAME

TECHNICAL FIELD

The invention relates to materials having ionic conductivity which are suitable for use as electrolytes in electrochromic systems. More specifically, the invention concerns colloidal materials which conduct alkaline cations as well as methods of preparing these materials and their use as electrolytes in electrochromic panes.

BACKGROUND OF THE INVENTION

The combination of a Bronsted polybase, defined as a polymer possessing proton acceptor centers, with a metal halide (MX) inorganic salt in the absence of a solvent has been very thoroughly investigated because of the ionic conduction properties of the resultant product. EP-A-13 199, for example, discloses macromolecular materials capable of ionic conduction. These materials comprise a solid solution of an alkali metal salt dissolved within a basic polymer, comprising heteroatoms selected from among oxygen, nitrogen, sulphur and phosphorous. The best conductivity was obtained with a complex of polyoxyethylene and lithium salt. Nevertheless, these materials are not entirely satisfactory for all purposes. A number of investigators have attempted to remedy the deficiencies of these materials without, however, achieving entirely satisfactory results.

It is known that conduction takes place almost exclusively when a polymer is in the elastomeric amorphous phase, such that the ions and the segments of the polymer are readily mobile. Moreover, polyether and polyimine homopolymers have a tendency to crystallize very easily. The introduction of certain macromolecular materials has been proposed to prevent such crystallization. EP-A-119 912, for example, describes macromolecules comprising copolymers of ethylene oxide with a second functional group comprising a cyclic etheroxide. Polymers are thus obtained which are less likely to crystallize than homopolymers having linear chains. On the other hand, however, the energy of solvation of the salt by the polymer is reduced due to the reduction in the number of basic centers carried by the polymer which are capable of dissociating the salt. There is thus a consequent reduction in the ionic conductivity of the material.

If crystallization of the polymer is to be prevented, the same is true of the vitrification of the polymer. Thus, the second criterion for selecting the polymer is that the material have a vitreous transition temperature which is as low as possible. This preserves the viscoelastic properties needed for the movement of the various chains and which, moreover, favor the proper use of the material. The material must be capable of being used in thin layers and must therefore be sufficiently flexible. In order to increase this flexibility, it is possible to "carry" the material to a higher temperature. Although temperatures in the vicinity of 80°-100° C. may be used for applications such as electrochemical generators, the same is not true for the use of this material in forming electrochromic panes as described below. Such panes which must be capable of operating at ambient temperature and even at temperatures below −10° C.

Further, analysis of the mechanism of conduction has shown that the anionic transport number is often equivalent to the cationic transport number, even with $ClO_4^-$, $SCN^-$ and $CF_3SO_3^-$ anions, the volume of which is, however, much greater than the volume of $Li^+$, $Na^+$ or $K^+$ cations. Moreover, the conduction of the cation fulfils an important role in various mechanisms, such as electrochromism. EP-A-213 985 discloses salts, the anion of which is present in the form of a polyether chain, wherein the end of the chain carries an anionic function. The length of the chain limits the mobility of the anion. In the same sense, it has also been proposed to graft the anions onto the polymeric chain or to associate them with this chain with hydrogen bonds.

Generally speaking, the ionic conductivities obtained at ambient temperatures are relatively low, for example, less than $10^{-5}\Omega^{-1}cm^{-1}$, which excludes the use of such materials for many practical applications.

Furthermore, the presence of water should systematically be avoided in these mixtures since the degree of conduction by protons and hydroxyls has sometimes been found to be greater than that attributable to the metallic cation. Moreover, water is highly injurious to the electrochemical stability of the electrolyte. It is necessary to operate within a narrow water concentration range, since gaseous hydrogen is otherwise formed and small bubbles appear. Moreover, water generally leads to accelerated ageing and, in addition, it may dissolve the thin layers of material in contact with the electrolyte.

Experiments have also been performed with materials which conduct alkali metals. Such materials are obtained by mixing an ionomer (i), produced by neutralization of a Bronsted polyacid with an alkali metal hydroxide (MOH), with a polar solvent (ii) capable of dissolving or at least plasticizing the ionomer (i).

It has recently been demonstrated that ionomers, such as sodium poly(styrene sulphonate) became polyelectrolytes conductive of the sodium ion, only when plasticized by poly(ethylene glycol) (PEG) having a low molecular weight (L. C. Hardy and D. F. Shriver, Journal of the American Chemical Society, 107, 3823 (1985)). Nevertheless, the conductivity value at ambient temperature remains lower than $10^{-6}\Omega^{-1}cm^{-1}$.

FR-2 597 491 describes a method of manufacturing colloids of perfluorinated ionomers by dissolving, in a suitable polar solvent, salts of NAFION ® (a registered trademark of Du Pont de Nemours), a fluorinated polymer carrying $-SO_3M$ ion exchanger groups, where $M^+$ is a metallic cation or a more complex cationic entity. The ionic conductivity of such colloids (sols or gels) may reach $5 \times 10^{-3}\Omega^{-1}cm^{-1}$ at ambient temperature. However, the products used have a high initial cost, which limits the use of such materials.

Additionally, a number of references have described the materials produced by combining an ionomer (i) as defined above and a Bronsted polybase (iii) of a polymer having proton acceptor centers as described above. The hydrogen bonding between acid functions of the first polymer and basic functions of the second polymer may lead to the formation of an intermolecular complex, following which the polymers are placed in a common solvent for mixing.

It is known, for example, that the addition of aqueous solutions of a polyether of a polyoxyethylene and of polyacrylic acid leads to the formation of a precipitate possessing an amorphous character and a rubbery appearance. The vitreous transition temperature of this precipitate is intermediate between that of polyoxyethylene and polyacrylic acid. In the complex thus formed, the two polymers are very highly imbricated due to the very large number of hydrogen bridges which are established. Thus, numerous polymer complexes, which give rise to proton acceptor proton-polymers, are likely to be obtained, provided that the forces of interaction between them are greater than the sum of the energies of solvation in the initial solutions.

A different result occurs if, before the mixing of the polymers, a certain number of the acid functions are neutralized by a base such as lithium hydroxide, sodium hydroxide or potassium hydroxide. The complexing between the two polymers can then no longer take place except through the intermediary of the non-neutralized acid functions, with correlation lengths that are shorter to the extent to which repulsive interactions appear between the ionized $-COO^-$ groups and the oxygens of the polyether. This partial neutralization therefore enables the desired cations to be introduced into the body of the macromolecular material, thus giving it the characteristic of an ionic conductor. Furthermore, the separation of the chains due to these repulsive interactions leads to an expansion of the polymers, which are formed into a gel that can easily be applied in thin layers.

As described in an article by M. Tsuchida et al., Solid State Ionics 116, 227-233 (1983), beyond a certain limiting neutralization rate ($\alpha_m$) the complex no longer forms. The different phases separate unless quantities of solvents incompatible with the envisaged uses are employed. Partial neutralization should therefore be understood to mean a neutralization rate ($\alpha$) such that $0 < \alpha < \alpha_m$.

Adequate conduction is possible only in the presence of a basic solvent, which enables the alkaline cations to be kept away from the influence of the $-COO^-$ groups of the acid polymer. In the absence of such a basic solvent, the pairs of ions are so strongly associated that the cation is in practice no longer mobile. The resultant material is thus a fairly poor ionic conductor.

When water is used as a basic solvent, a very high ionic conductivity is obtained, for example of the order of $10^{-3}\Omega^{-1}cm^{-1}$ at 20° C. This value is 100 to 1,000 times greater than that obtainable with macromolecular materials having a known ionic conductivity. Nevertheless, this high conductivity is probably partly due to the dissociation of the water arising from the solvent and the protons of the acid polymer. On the other hand, as discussed above, the presence of water is not always desirable in electrochemical devices, particularly in those devices which use reversible electrodes in contact with an aqueous solution, such as devices formed partly of electrochromic materials.

In such cases, it is preferable to use as the basic solvent a polar organic solvent, chosen as a function of the nature of the acid and basic polymers, (the basic solvent should not cause the mixture of polymers to segregate), of the acidity of the acid polymer, of the neutralization rate ($\alpha$) and of the nature of the cation M+. It is known, for example, that the interaction of the COO- groups with M+ decreases in the series LI+, Na+, K+, and of its ranges of thermal and electrochemical stability, although on these two latter points the majority of the polar organic solvents possess properties better than those of water.

SUMMARY OF THE INVENTION

The present invention is therefore aimed at providing new materials having ionic conductivity and film-forming properties which are comparatively simple to prepare and which have a low initial cost. Moreover, the ionic conduction of these materials is sufficient to enable them to be used in electrochromic systems.

The conductive materials according to the present invention are colloids capable of conducting alkaline cations. These colloids comprise a mixture containing suitable proportions of an ionomer (i) obtained by neutralization of a Bronsted polyacid (possessing proton donor centers) by an alkali metal hydroxide (MOH) and a polar solvent (ii) capable of solubilizing or plasticizing the ionomer (i) and of assuring a partial dissociation of the ions and pairs of ions and the transportation of the M+ ions. The neutralization rate $\alpha$ is such that $0 < \alpha < \alpha_m$. The ionomer (i) carries anionic groups fixed to the polymeric chain and associated with alkaline cations (M+).

Polyacids that are suitable for use as ionomers (i) include acid polymers of polycarboxylic acid, polysulphonic acid, polyphosphoric acid, polyphosphorous acid, etc., in which the acid groups (i.e., $-COOH$, $-SO_3H$, $-PO_3H_2$ or $=PO_3H$) may be easily neutralized by an alkali metal hydroxide, with the exception of compounds similar to NAFION ®.

The most preferred polycarboxylic acids are polyacrylic acid (PAA), polymethacrylic acid (PMMA) and their copolymers with amine, amide, etc., functional groups.

The polar solvent (ii) assures the partial dissociation of the pairs $-COOM^+$, $-SO_3^-M^+$, $-PO_3H^-M^+$, $=PO_{3M}+$, etc., and the transportation of the M ions. In fact, the "dry" ionomer (i) possesses only a very low conductivity, for example less than $10^{-9}\Omega^{-1}cm^{-1}$. It should be noted generally that, in the alkali series, the interaction between the anion and M+ increases as one passes from Cs+ to K+, Na+ and Li+.

The nature of the polar solvent (ii) depends upon the nature of the polyacid, its neutralization rate and, to a lesser degree, upon the nature of M. Generally speaking, the solvent may with advantage be chosen from the list of solvents or mixtures of solvents commonly used in electrochemical generators. These include, for example, aprotic dipolar solvents belonging to the family of the non-substituted, N-monosubstituted or N-N-disubstituted amides. The most commonly used of these includes, for example, formamide, acetamide, N-methylformamide (NMF), N-methylacetamide (NMA), N-N-dimethylformamide (DMF), N-N-dimethylacetamide (DMA), etc.

Other aprotic dipolar solvents having a relatively high dielectric constant include acetonitrile (AN), dimethylsulphoxide (DMSO), sulpholane, propylene carbonate (PC), ethylene glycol carbonate (EGC), hexamethylphosphoramide (HMPA), hexamethylphosphotriamide (HMPT), the pyrrolidones, etc.

Finally, typical polar solvents having a proton donor character include the alcohols and polyalcohols. Among the latter, ethylene glycol (EG), propylene glycol, diethylene glycol, glycerol, etc. are preferred.

Of greater interest are those polyethylene glycols $H(OCH_2CH_2)_nOH$ (PEG) with a low molecular weight of, for example, between 200 and 1,000 and which are liquid near ambient temperature (the melting point of PEG having a molecular weight of 1,000 is of the order of 37° C.). The role of these materials as a plasticizer is well known.

The ionic conductive material of the present invention may also comprise a third constituent (iii), i.e., a Bronsted polybase, which is soluble in solvent (ii) and which does not form a solid precipitate with the ionomer (i). The role of the polybase (iii) is, on the one hand, to increase the viscosity of the medium and therefore to facilitate the production of the electrolyte as a thin layer in an electrochemical device. On the other hand, it contributes to the dissociation of the pair of ions by solvating the $M^+$ cation as the latter is produced in the complexes of the polyether-lithium salts previously described.

It is essential that the addition of polybase (iii) to the mixture of ionomer (i) and solvent (ii) shall not produce either a precipitate due to the formation of a complex of polymers between (i) and (ii), or a separation into two liquid phases having different concentrations of dissolved materials. The three constituents (i) (ii) and (iii) should therefore be chosen in such a manner as to form a homogeneous phase of the sol or gel type.

Polybase (iii) may comprise a polyether, e.g., polyoxyethylene (POE), a polyamide, e.g., polyvinylpyrrolidone (PVP), a polyacrylamide, or a polyimide, e.g., polyethyleneimide (PEI).

Also included with the polybases (iii) are the polyethylene glycols (PEG) having a molecular weight greater than 1,000 and less than 10,000, which contain a very predominant number of "ether" functions in relation to the terminal "alcohol" functions and which are solid at ambient temperature. Numerous PEGs of molecular weight between 200 and 10,000 are advantageously commercially available.

The ionic conductor material according to the invention may additionally contain a fourth constituent, i.e., an (MX) inorganic salt (iv), soluble in solvent (ii), where $M^+$ is the same alkaline cation as that used during the neutralization of the polyacid (i) and where X is a monovalent anion such as a halide, $ClO_4$, $BF_4$, $CF_3SO_3$, etc. It has been observed that the addition of an inorganic salt (iv) to the ternary mixture (i), (ii), (iii) can favorably modify the viscosity of the medium and appreciably increase its conductivity.

One of the advantages of the ternary solution, i.e., its essentially cationic conduction, if of course then lost, because the increase in conductivity in the quaternary mixture is then partly due to the transporting of the $X^-$ anion. However, it can still be advantageous in certain applications to increase the cationic conductivity to an extent such that the transportation of the anion does not cause undesirable parasitic reactions at the electrodes.

DETAILED DESCRIPTION OF THE PREFERRED EMBODIMENTS

Various colloidal materials possessing ionic conductivity in accordance with this invention were prepared in accordance with the following specification:

Preparation or Selection of the Constituents

(i) IONOMERS

Certain ionomers are commercially available, such as poly(sodium 4-styrene sulphonate) $[CH_2CH(C_6H_4SO_3Na)]_n$, the sodium salt of poly(vinyl sulphonic) acid $[CH_2CH(SO_3Na)]_n$, etc. More generally, however, it is the polyacid forms of these materials that are commercially available.

With the use of these materials it is necessary to carry out the neutralization of a certain percentage ($\alpha$) of the acid groups carried by the polymer, wherein $\alpha$ ranges between, for example, 1% and 100%, i.e., from 0.01 to 1. This neutralization is carried out with titrated aqueous solutions of LiOH, NaOH or KOH, added in a known quantity to an aqueous solution of the polyacid.

EXAMPLE

Starting with a 37% commercial aqueous solution of PAA MW 170,000) and of lithium hydroxide monohydrate $LiOH,H_2O$ (Aldrich 99.9%):

20 g of the aqueous PAA solution were weighed, corresponding to $20 \times 37/100 \times 1/72 = 0.1028$ mole of the $-CH_2CH(COOH)-$ functional group.

2.098 g of $LiOH,H_2O$ were dissolved in distilled water and the volume of the solution was adjusted to 100 ml. The solution thus obtained contained 0.5M of LiOH. However, its exact molarity was verified by titration with 0.5N HCl to take into account any evolution that might occur within the commercial starting product by hydration and carbonation.

$0.01028 \times 1,000/0.5 = 20.56$ ml of the 0.5M LiOH solution was added to the 20 g of 37% aqueous solution of PAA.

The mixture was stirred with a magnetic agitator in a beaker for approximately 1 hour to cause it to become completely homogenized.

An aqueous solution of PAA was obtained, neutralized to 10% by LiOH. That is to say that 10% of the $-COOH$ acid groups were replaced by the ion pairs $-COO^-Li^+$. This neutralization rate may obviously be adjusted to any desired value between 0 and 100% by redefining the volume of the 0.5MLiOH solution to be initially added.

In the same manner, it is relatively easy to replace the LiOH solution by titrated solutions of NaOH or KOH so as to introduce $COO^-Na^+$ or $COO^-K^+$ groups. At this stage, it may be advantageous to evaporate the water in order to obtain the dry ionomer. This can be done by heating the mixture towards 60° C. under primary vacuum for several hours until a solid whitish mass is obtained, which can be reduced to the powder state under dry air or dry nitrogen in a glove box.

The ionomer powder was then dispersed in 200 ml of anhydrous methanol and the mixture was subjected to stirring with slight heating, i.e., to 50° C., until it completely dissolved. At the end of the operation, the volume of the solution was made up to 200 ml in a gauged flask. A methanolic solution of PAA was thus formed in which 10% of acid protons have been replaced by $Li^+$ and which contained 0.1029 moles of the elementary functional group in 200 ml or 0.514 moles of functional group/liter.

Redissolving the ionomer powder in methanol takes a relatively long time. It may therefore be advantageous to make use of a neutralization method described in N. T. N. Klooster, et. al., Macromolecules, 17, pp. 2070-2093 (1984) in which lithium methanolate ($LiOCH_3$) or sodium methanolate ($NaOCH_3$) are used. These methanoleate materials are products of the action of lithium or sodium, respectively, on methanol. Since the polycarboxylic acids such as PAA or PMAA are soluble in methanol, a method is thus available which enables methanolic ionomer solutions to be directly obtained with complete avoidance of water.

The advantage of forming a methanolic solution of the ionomers (i) is that methanol is a volatile solvent which can be easily evaporated afterwards to the benefit of a not very volatile polar solvent. It is also advantageous to mix the methanolic solution of the ionomer (i) with a solution of the polybase (iii) in a polar solvent (ii).

(ii) SOLVENTS

Commercial solvents of high purity were used to form the composition of the present invention. For example, the methanol, the dimethyl sulphonide, etc. were of "spectrophotometric" quality (Aldrich 99.9%). No additional purification of these solvents was carried out. Applicants simply observed the usual precautions for protecting these anhydrous solvents.

The choice of the solvent is primarily guided by its suitability for solubilizing the other constituents. In choosing the solvents for use with the present invention, applicants consulted publications such as the Encyclopedia of Polymer Science and Technology, Ed. H. F. Mark, N. G. Gaylord and N. M. Bikales, Interscience Publishers.

(iii) BASIC POLYMERS

Mother solutions of the basic polymers in anhydrous polar solvents (ii) were also prepared. The polymer concentration, when the solubility in the solvent permitted it, was adjusted to around 0.5 mole functional group/liter.

(iv) INORGANIC SALTS (MX)

The salts of Li, Na or K (halides, chlorates, triflates, etc.) were also previously dissolved in a polar solvent (ii) or alternately in methanol.

II—PREPARATION AND CHARACTERIZATION OF THE MIXTURES

1—Solubilizing or Plasticizing an Ionomer (i)/(ii)

The polyelectrolytes obtained by solubilization of an ionomer in water and in methanol have been very thoroughly studied in the literature.

In the case of the PAA $\alpha$Li$^+$/methanol system where $\alpha$Li$^+$ represents the degree of neutralization by LiOH, applicants measured the conductivity of solutions having a relatively high concentration of polymer.

EXAMPLE 1

A methanolic solution of PAA(0.1 Li$^+$) having 0.514 mole of functional group/liter was heated under primary vacuum to approximately 50° C. in order to degas it and to remove a portion of the methanol. A solution of 0.72 mole of functional group/liter was obtained after about 1 hour of this treatment. The ionic conductivity of this solution was $8 \times 10^{-4} \Omega^{-1}$cm$^{-1}$ at 300° K.

With solvents that are more polar and less volatile than methanol, the polyeleotrolyte property of the material is maintained.

EXAMPLE 2

To 20 ml of a methanolic solution of PAA 0.1 Li$^+$ with a concentration of 0.514 mole of functional group/liter, there was added 0.462 g of PEG (Aldrich) having a molecular weight of 1,000. The mixture was stirred until homogenization was complete, i.e., for about 30 minutes. Then an evaporation of the methanol under primary vacuum was carried out by heating the mixture to 60° C.

The final product was a transparent elastomer of high viscosity, from which a sample was taken for a conductivity measurement.

The final concentration of PAA, 0.1 Li$^+$ in the PEG of molecular weight 1,000 is of the order to 9.45 mole of functional group/liter. Thus, there is practically the same number of carboxylic or carboxylate groups as —OCH$_2$CH$_2$— groups.

The conductivity measurements of this material as a function of the temperature and after supplementary drying for 24 hours under vacuum at 80° C. "in situ" gave the following results:

| t° C. | 80 | 60 | 20 |
|---|---|---|---|
| $\sigma(\Omega^{-1}$cm$^{-1})$ | $6.9 \times 10^{-5}$ | $2.5 \times 10^{-5}$ | $1.7 \times 10^{-6}$ |

EXAMPLE 3

5 ml. of DMSO were added to 20 ml of a methanolic solution of PAA;0.2Li$^+$ having a concentration of 0.514 mole of functional group liter. After homogenization, the mixture was heated under primary vacuum to 80° C. for approximately 12 hours in order to remove the methanol and a portion of the DMSO. A first solution of PAA, 0.2Li$^+$ in the DMSO containing 18% by weight of polymer was obtained, having a concentration of 2.4 moles of functional group/liter. Later evaporations of a portion of this solution produced a more concentrated solution, the viscosity of which is better adapted to the manufacture of thin layers.

The concentrations (C) of these solutions and their conductivities $\alpha$ at 300° K. are set out in the following table:

| C (moles/liter) | 2.4 | 3.5 | 6.8 |
|---|---|---|---|
| $\sigma(\Omega^{-1}$cm$^{-1})$ | $4 \times 10^{-4}$ | $9.6 \times 10^{-5}$ | $5.5 \times 10^{-5}$ |

The same procedure applied to a solution of PAA, 0.1Li$^+$ in DMSO gave the following results: the first solution, more dilute than previously, had a concentration of 0.8 mole of functional group/liter. The conductivity of the solution at 300° K. was $\sigma = 4.4 \times 10^{-4} \Omega^{-1}$cm$^{-1}$. After evaporation towards concentrations of the order of 5 moles/liter: $\sigma = 3 \times 10^{-5} \Omega^{-1}$cm$^{-1}$.

It should be noted that in the foregoing examples, the starting point was always a methanolic solution of the ionomer. This is unavoidable with highly viscous solvents such as PEG 1,000. With a solvent such as DMSO, however, it is possible to avoid the passage through the methanolic solution by dissolving the dry ionomer and anhydrous PAA,$\alpha$Li$^+$ directly in the DMSO.

It should be pointed out, however that with certain polar solvents such as sulpholane and propylene carbonate the ionomer PAA,$\alpha$Li$^+$ gives rise to a solid precipitate.

Sulpholane and propylene carbonate are examples of polar solvents which should not be used for this process.

2—Ternary Mixture of Ionomer/Polybase/Solvent

The number of possible combinations for conserving a homogeneous colloidal solution is limited even further when a polybase is added. It is necessary to avoid segregations or precipitates.

EXAMPLE

To 20 ml of a solution of polyvinyl pyrrolidone (PVP Aldrich MW40,000) having a concentration 0.5 mole of functional group/liter in DMSO, there was added 0.73 g of PAA,0.15Li+ in the form of an anhydrous powder.

After stirring for several hours, a homogeneous solution was obtained in which there was almost an equal number of functional groups of both polymers. This solution was then heated to 70° C. under primary vacuums for several hours in order to degas it and remove a portion of the DMSO. When it was brought into a colloidal state which is ready for the production of thin layers, its conductivity at 300° K. was $8 \times 10^{-5} \Omega^{-1} cm^{-1}$.

III—APPLICATIONS

The colloidal materials according to the present invention lend themselves very readily to use in the form of thin layers. By reason of their high ionic conductivity they find applications in various electrochemical devices such as generators. One important application (due to the total absence of water), is the use of these materials as an electrolytic layer in an electrochromic cell, notably an electrochromic pane constituted, for example, of the following stacked assembly: glass/transparent electrode $(In_2O_3)$/electrochromic material $(WO_3)$/colloidal material according to this invention/counter-electrode/transparent electrode $(In_2O_3)$/glass. Such a pane may be produced by choosing, as the electrolyte, a PAA-0.2 Li+ system with 2.4 mole per liter and, as counter-electrode, a layer of nickel oxide according to the method disclosed in U.S. patent application Ser. No. 438,566 filed on 17 Nov. 1989 which is assigned to the assignee of the present application.

We claim:

1. An ionic-conductive colloidal material which comprises:
   a) an ionomer produced by the neutralization of a Bronsted polyacid, the rate of neutralization ($\alpha$) being such that $0 < \alpha < \alpha_m$, wherein $\alpha_m$ is a neutralization rate beyond which a phase separation takes place, wherein said polyacid is a polymer of an acid selected from the group consisting of polyphosphoric acid and polyphosphorous acid, and wherein said ionomer comprises a polymeric chain having a plurality of anionic groups affixed thereto and a plurality of alkaline cations associated therewith; and
   b) a polar solvent selected from the group consisting of aprotic dipolar solvents and solvents capable of donating a proton,
   said solvent capable of reacting with said ionomer to cause said ionomer to solubilize or plasticize and of assuring at least a partial ionic disassociation thereon as well as transporting said alkaline cations.

2. The conductive colloidal material of claim 1 wherein said solvent is selected from the group consisting of formamide, acetamide, N-methylformamide, N-N-dimethylformamide, N-N-dimethylacetamide, acetonitrile, dimethlsulphoxide, sulpholane, propylene carbonate, ethylene glycol carbonate, hexamethylphosphoramide, hexamethylphosphotriamide, pyrrolidone, ethylene glycol, propylene glycol, diethylene glycol, glycerol and polyethylene glycols having a molecular weight ranging between about 200 and 1,000 and mixtures thereof.

3. An electrochromic cell comprising an ionic-conductive colloidal material, said colloidal material comprising:
   a) an ionomer produced by the neutralization of a Bronsted polyacid, the rate of neutralization ($\alpha$) being such that $0 < \alpha < \alpha_m$, wherein $\alpha_m$ is a neutralization rate beyond which a phase separation takes place, wherein said polyacid is a polymer of an acid selected from the group consisting of polycarboxylic acid, polysulphonic acid, polyphosphoric acid and polyphosphorous acid, and wherein said ionomer comprises a polymeric chain having a plurality of anionic groups affixed thereto and a plurality of alkaline cations associated therewith; and
   b) a polar solvent selected from the group consisting of aprotic dipolar solvents and solvents capable of donating a proton,
   said solvent capable of reacting with said ionomer to cause said ionomer to solubilize or plasticize and of assuring at least a partial ionic disassociation thereon as well as transporting said alkaline cations.

4. An ionic-conductive colloidal material which comprises:
   a) an ionomer produced by the neutralization of a Bronsted polyacid, the rate of neutralization ($\alpha$) being such that $0 < \alpha < \alpha_m$ wherein $\alpha_m$ is a neutralization rate beyond which a phase separation takes place, wherein said polyacid is a polymer of a polycarboxylic acid selected from the group consisting of polyacrylic acid, polymethacrylic acid and their amine and amide copolymers, wherein said ionomer comprises a polymeric chain having a plurality of anionic groups affixed thereto and a plurality of alkaline cations associated therewith; and
   b) a polar solvent selected from the group consisting of aprotic dipolar solvents and solvents capable of donating a proton,
   said solvent capable of reacting with said ionomer to cause said ionomer to solubilize or plasticize and of assuring at least a partial ionic disassociation thereon as well as transporting said alkaline cations.

5. A colloidal material capable of conducting alkaline cations, which comprises:
   a) An ionomer produced by the neutralization of a Bronsted polyacid, the rate of neutralization ($\alpha$) being such that $0 < \alpha < \alpha_m$, wherein $\alpha_m$ is a neutralization rate beyond which a phase separation takes place, wherein said polyacid is a polymer of an acid selected from the group consisting of polycarboxylic acid, polysulphonic acid, polyphosphoric acid and polyphosphorous acid, and wherein said ionomer comprises a polymeric chain having a plurality of anionic groups affixed thereto and a plurality of alkaline cations associated therewith;
   b) a polar solvent selected from the group consisting of aprotic dipolar solvents and solvents capable of donating a proton, said solvent capable of reacting with said ionomer to cause said ionomer to solubilize or plasticize and of assuring at least a partial disassociation thereon, as well as transporting said alkaline cations; and
   c) a Bronsted polybase which is soluble in said polar solvent and which does not form a solid precipitate with said ionomer, said polybase selected from the group consisting of polyethers, polyamides, polyacrylamides, polyimides and polyethylene glycols having a molecular weight of between about 1,000 and 10,000.

6. The conductive colloidal material of claim 5 wherein said polybase is selected from the group consisting of polyoxyethylene, polyvinyl pyrrolidone and polyethyleneimide.

7. The conductive colloidal material of claim 5 wherein said polyacid is a polymer of an acid selected from the group consisting of polycarboxylic acid, polysulphonic acid, polyphosphoric acid and polyphosphorous acid.

8. The conductive colloidal material of claim 7 wherein said polyacid is a polymer of a polycarboxylic acid selected from the group consisting of polyacrylic acid, polymethacrylic acid and their amine and amide copolymers.

9. An electrochromic cell comprising the colloidal material of claim 5.

10. The conductive colloidal material of claim 5 wherein said solvent is selected from the group consisting of formamide, acetamide, N-methylformamide, N-N-dimethylformamide, N-N-dimethylacetamide, acetonitrile, dimethlsulphoxide, sulpholane, propylene carbonate, ethylene glycol carbonate, hexamethylphosphoramide, hexamethylphosphotriamide, pyrrolidone, ethylene glycol, propylene glycol, diethylene glycol, glycerol and polyethylene glycols having a molecular weight ranging between about 200 and 1,000 and mixtures thereof.

11. A colloidal material capable of conducting alkaline cations which comprises:
   a) An ionomer produced by the neutralization of a Bronsted polyacid, the rate of neutralization ($\alpha$) being such that $0<\alpha<\alpha_m$, wherein $\alpha_m$ is a neutralization rate beyond which a phase separation takes place, wherein said polyacid is a polymer of an acid selected from the group consisting of polycarboxylic acid, polysulphonic acid, polyphosphoric acid and polyphosphorous acid, and wherein said ionomer comprises a polymeric chain having a plurality of anionic groups affixed thereof and a plurality of alkaline cations associated therewith;
   b) a polar solvent selected from the group consisting of aprotic dipolar solvents and solvents capable of donating a proton, said solvent capable of reacting with said ionomer to cause said ionomer to solubilize or plasticize and of assuring at least a partial disassociation thereon, as well as transporting said alkaline cations;
   c) a Bronsted polybase which is soluble in said polar solvent and which does not form a solid precipitate with said ionomer, said polybase selected from the group consisting of polyethers, polyamides, polyacrylamides, polyimides and polyethylene glycols having a molecular weight of between about 1,000 and 10,000; and
   d) an MX inorganic salt soluble in said polar solvent, wherein $M^+$ is the same alkaline cation as that utilized to neutralize the polyacid and X is a monovalent anion selected from the group consisting of Cl, Bi, F, $ClO_1$ and $CF_3SO_3$.

12. An electrochromic cell comprising the colloidal material of claim 11.

13. The conductive colloidal material of claim 11 wherein said polyacid is a polymer of a polycarboxylic acid selected from the group consisting of polyacrylic acid, polymethacrylic acid and their amine and amide copolymers.

14. The conductive colloidal material of claim 11 wherein said solvent is selected from the group consisting of formamide, acetamide, N-methylformamide, N-N-dimethylformamide, N-N-dimethylacetamide, acetonitrile, dimethlsulphoxide, sulpholane, propylene carbonate, ethylene glycol carbonate, hexamethylphosphoramide, hexamethylphosphotriamide, pyrrolidone, ethylene glycol, propylene glycol, diethylene glycol, glycerol and polyethylene glycols having a molecular weight ranging between about 200 and 1,000 and mixtures thereof.

15. The conductive colloidal material of claim 11 wherein said polybase is selected from the group consisting of polyoxyethylene, polyvinyl pyrrolidone and polyethyleneimide.

16. An ionic-conductive colloidal material which comprises:
   a) an ionomer produced by the neutralization of a Bronsted polyacid, the rate of neutralization ($\alpha$) being such that $0<\alpha<\alpha_m$ wherein $\alpha_m$ is a neutralization rate beyond which a phase separation takes place, wherein said polyacid is a polymer of an acid selected from the group consisting of polyphosphoric acids and polyphosphorous acids, and wherein said ionomer comprises a polymeric chain having a plurality of anionic groups affixed thereto and a plurality of alkaline cations associated therewith; and
   b) a polar solvent selected from the group consisting of formamide, acetamide, N-methylformamide, N-N-dimethylformamide, N-N-dimethylacetamide, acetonitrile, dimethlsulphoxide, sulpholane, propylene carbonate, ethylene glycol carbonate, hexamethylphosphoramide, hexamethylphosphotriamide, pyrrolidone, ethylene glycol, propylene glycol, diethylene glycol, glycerol and polyethylene glycols having a molecular weight ranging between about 200 and 1,000, and mixtures thereof, said solvent capable of reacting with said ionomer to cause said ionomer to solubilize or plasticize and of assuring at least a partial ionic disassociation thereon as well as transporting said alkaline cations.

* * * * *